United States Patent
Bodo et al.

(10) Patent No.: US 6,292,852 B1
(45) Date of Patent: Sep. 18, 2001

(54) HIGH-PERFORMANCE MULTIPLE-MEDIA DUPLICATING SYSTEM

(75) Inventors: Martin J. Bodo, Los Altos Hills; Robert A. Rosenbloom, Santa Cruz; Dennis A. Kerrisk, Santa Clara, all of CA (US)

(73) Assignee: Computer Performance, Inc., Santa Clara, CA (US)

( * ) Notice: Subject to any disclaimer, the term of this patent is extended or adjusted under 35 U.S.C. 154(b) by 0 days.

(21) Appl. No.: 09/178,072

(22) Filed: Oct. 23, 1998

(51) Int. Cl.$^7$ .................................................. G06F 13/14
(52) U.S. Cl. .............................. 710/20; 360/15; 369/84
(58) Field of Search .............................. 360/15; 369/84; 710/20, 21

(56) References Cited

U.S. PATENT DOCUMENTS

| | | | |
|---|---|---|---|
| 4,375,655 | 3/1983 | Korth et al. | 360/15 |
| 4,551,840 | 11/1985 | Fujii et al. | 371/38 |
| 4,618,897 | * 10/1986 | Johnson et al. | 360/15 |
| 4,727,509 | * 2/1988 | Johnson et al. | 360/15 |
| 5,084,789 | 1/1992 | Kamo et al. | 360/53 |
| 5,239,445 | 8/1993 | Parks et al. | 361/729 |
| 5,530,960 | 6/1996 | Parks et al. | 395/825 |
| 5,579,474 | 11/1996 | Kakuta et al. | 395/182.04 |
| 5,644,705 | 7/1997 | Stanley | 395/183.18 |
| 5,796,684 | * 8/1998 | Yaegashi | 369/30 |

* cited by examiner

*Primary Examiner*—Thomas Lee
*Assistant Examiner*—Ilwoo Park
(74) *Attorney, Agent, or Firm*—D. E. Schreiber

(57) ABSTRACT

A multiple-media duplicating system concurrently copies digital data from a master media to several copy media. The system includes a master input/output ("I/O") port and several copy I/O ports equal in number to the number of copy media. A special I/O port, coupled in parallel to each of the copy I/O ports, effects a concurrent transfer of digital data from the master media to all of the copy media. The system may further include a circuit which effects copying of data from the master media to the copy media while concurrently preventing conventional direct access to devices that contain the media. A particularly preferred embodiment further includes an adjustable, variable-frequency generator that is coupled to the digital logic circuit, and supplies a clock signal to the digital logic circuit which determines a rate at which digital data is copied from the master media in parallel to the copy media.

8 Claims, 6 Drawing Sheets

FIG. 11
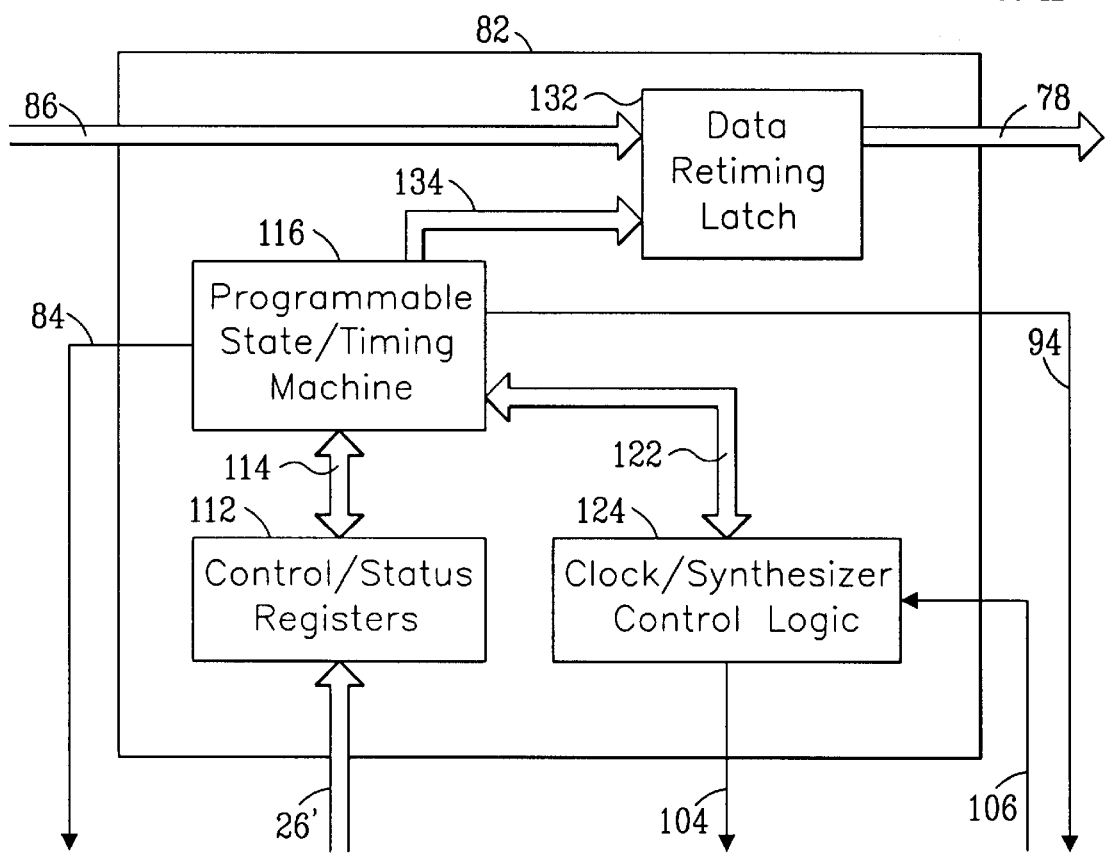
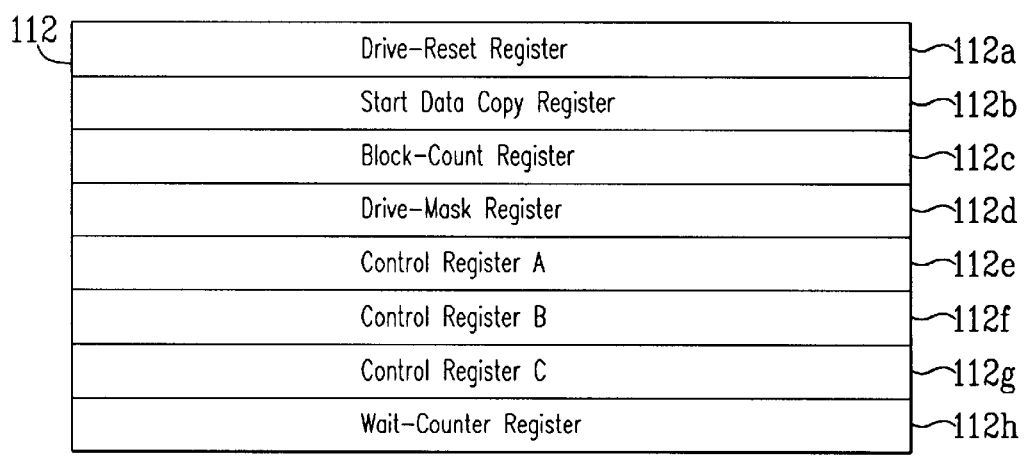
FIG. 12

HIGH-PERFORMANCE MULTIPLE-MEDIA DUPLICATING SYSTEM

BACKGROUND OF THE INVENTION

1. Field of the Invention

The present invention relates generally to digital computers and, more particularly, to systems for concurrently copying the same, identical data from a master hard disk to a plurality of copy hard disks.

2. Description of the Prior Art

Companies which assemble personal computer systems, laptop and notebook computer systems, computer workstation systems, file server systems, etc. often include in such systems a hard disk onto which has been recorded various data. The data recorded onto the hard disk may include computer programs, device driver programs, instruction materials and/or manuals, system configuration data, and/or other data. While various alternative techniques exist for recording such programs and/or data onto hard disks, productivity considerations prevent mass assemblers of computer systems from loading programs and/or data onto the hard disks from conventional source media such as floppy disks and/or compact disk read-only-memory disks ("CD-ROMs"), or from a network file server. Consequently, computer system assemblers usually employ a multi-disk duplicating system that concurrently copies digital data from a master hard disk on which the data resides to a number of copy hard disks that are subsequently installed into computer systems.

Various techniques have been developed for increasing the speed at which digital data may be copied to magnetic recording media. U.S. Pat. No. 4,239,445 entitled "Method and Apparatus for Simultaneous Operation of Two IDE Disk Drives" uses unused wires in an Integrated Drive Electronics ("IDE") disk drive cable to carry additional control signals from a multi-disk adapter to two (2) IDE disk drives. The multi-disk adapter described in this patent uses the previously unused wires to rapidly access two (2) IDE drives in succession, and then allows both IDE disk drives to process commands and data simultaneously.

U.S. Pat. No. 4,375,655 entitled "Universal Digital Data Copying System" first describes a common technique for copying data fields without requiring mechanical synchronization of drive units. This first technique is to store the entire data field in a buffer memory, and then to serially write the data from the buffer memory onto a duplicate disk. An alternative, second common data copying technique also described in the patent electro-mechanically synchronizes rotation of copy drives with rotation of a master drive. While this second, synchronization technique omits the buffer memory, it requires using expensive, precision drives. Improving upon these two common techniques, this patent discloses using a phase locked oscillator ("PLO") and a fixed clock timing circuit in conjunction with a high-speed buffer memory for copying data. Digital data read from a master disk is used to establish an operating frequency for a tracking clock, preferable the PLO, which controls storage of data into the buffer memory. After some data is present in the buffer memory and a copy drive controller receives an index pulse from a slave drive, data is written from the buffer memory to the slave drive under the control of signals from the fixed clock timing circuit. A system disclosed in this patent couples together any number of drive units to permit concurrently making any number of duplicate copies from a single master copy.

FIG. 1 illustrates a conventional, prior art multi-disk duplicating system, such as those used by companies which assemble computer systems, that is referred to by the general reference character 20. As depicted in FIG. 1, the prior art multi-disk duplicating system 20 employs a conventional microprocessor based digital computer architecture. Thus, the multi-disk duplicating system 20 includes a microprocessor central processing unit ("CPU") 22 and a random access memory ("RAM") 24 that are interconnected by a system bus 26. Also connected to the system bus 26 is a system-bus interface 32 of a master input/output port 34. The master input/output port 34 also includes a master hard-disk interface 36 that is connected by a hard drive cable 38 to a master hard disk 42.

The prior art multi-disk duplicating system 20 also includes a plurality of copy I/O ports 52a–52d, each of which respectively includes a system-bus interface 54 that couples one of the copy I/O ports 52a–52d to the system bus 26. Similar to the master input/output port 34, each of the copy I/O ports 52a–52d also respectively includes a copy hard-disk interface 56, that is respectively connected by a hard drive cable 58 to a plurality of copy hard disks 62a–62d. As depicted in FIG. 1, the plurality of copy I/O ports 52a–52d equals in number the plurality of copy hard disks 62a–62d. The architecture of the multi-disk duplicating system 20 depicted in FIG. 1 may be used f or copying data between hard disks that are compatible with either the IDE/ATA standard, or with the Small Computer System Interface ("SCSI") standard.

The RAM 24 of the multi-disk duplicating system 20 stores both a disk-copy digital computer program that is executed by the microprocessor CPU 22, and, as will be explained in greater detail below, digital data that is copied from the master hard disk 42 to the copy hard disks 62a–62d. During normal operation of the multi-disk duplicating system 20, the microprocessor CPU 22 retrieves the digital computer program from the RAM 24, and then executes the digital computer program first for retrieving digital data digital data from the master hard disk 42 for storage into the RAM 24, and subsequently for writing the digital data from the RAM 24 sequentially to all the copy hard disks 62a–62d.

FIG. 2 is a timing diagram conceptually illustrating normal operation of the prior art multi-disk duplicating system 20 for copying digital data from the master hard disk 42 to each of the copy hard disks 62a–62d. In copying the digital data from the master hard disk 42 to the copy hard disks 62a–62d, the microprocessor CPU 22, executing the computer program, loops repetitively through a sequence of operations that are listed vertically downward along the left hand side of FIG. 2. Thus, the microprocessor CPU 22 first loops back to begin the sequence of operations. Then the microprocessor CPU 22 reads one word of data from the master hard disk 42 using the master input/output port 34 for storage into the RAM 24. The microprocessor CPU 22 then fetches the data from the RAM 24, and subsequently, using the respective copy I/O ports 52a–52d, the microprocessor CPU 22 causes that word of data to be sequentially written first to copy hard disk 62a, then to copy hard disk 62b, then to copy hard disk 62c, and finally to copy hard disk 62d.

In FIG. 2, each vertical line 68 indicates a single clock cycle of the microprocessor CPU 22. Thus, each looping operation of the microprocessor CPU 22 requires four (4) clock cycles. Each reading operation performed by the microprocessor CPU 22 requires nine (9) clock cycles. Storing the data from the microprocessor CPU 22 into the RAM 24 requires nine (9) clock cycles. Fetching the data from the RAM 24 also requires nine (9) clock cycles. Finally, writing the data to each of the copy hard disks 62a–62d requires nine (9) clock cycles. Thus, reading each word of data and writing that word of data to all four copy hard disks 62a–62d requires a total of sixty-seven (67) clock cycles. As illustrated in FIG. 2, in this way the prior art multi-disk duplicating system 20 accesses only one hard disk at a time, first the master hard disk 42 and then the copy hard disks 62a–62d one after the other. Accordingly, the microprocessor CPU 22 must interact with each hard drive individually one at a time, and the more hard drives connected to the multi-disk duplicating system 20, the slower its operation.

Using the architecture depicted in FIG. 1, copying data from the master hard disk 42 to four copy hard disks 62a–62d for 2.0 gigabyte ("G byte") hard disk drives requires approximately 142 minutes. Reducing the time required for copying that amount of data requires a microprocessor having a data transfer bandwidth much greater than the data bandwidth at which hard disk drives transmit or receive data. Microprocessors capable of providing such high performance are comparatively expensive. However, even such high performance microprocessors experience a performance degradation if the number of hard disk drives attached to the multi-disk duplicating system 20 were to increase from the four (4) depicted in FIG. 1 to eight (8) or sixteen (16). Moreover, increasing the performance of the multi-disk duplicating system 20 having the architecture depicted in FIG. 1 also requires using expensive, high speed memory for the RAM 24.

SUMMARY OF THE INVENTION

An object of the present invention is to permit more swiftly copying digital data from a master hard disk to several copy hard disks.

Another object of the present invention is to provide a high-performance multiple-media duplicating system for copying digital data from a master hard disk to several copy hard disks.

Another object of the present invention is to provide a simple multiple-media duplicating system for swiftly copying digital data from a master hard disk to several copy hard disks.

Another object of the present invention is to provide an economical multiple-media duplicating system for swiftly copying digital data from a master hard disk to several copy hard disks.

Briefly, a multiple-media duplicating system in accordance with the present invention, that concurrently copies digital data from a master hard disk to a number of copy hard disks, includes a system-bus to which are coupled a random access memory ("RAM") and a microprocessor central processing unit ("CPU") similar to the multi-disk duplicating system 20. The RAM stores both a disk-copy digital computer program and digital data. The microprocessor CPU retrieves the digital computer program from the RAM, and executes the digital computer program for copying digital data to all the copy hard disks concurrently with retrieving the digital data from the master hard disk.

The multiple-media duplicating system also includes a master input/output ("I/O") port having a system-bus interface that is coupled to the system-bus. The master I/O port also has a hard-disk interface adapted for being coupled to the master hard disk. The multiple-media duplicating system further includes a plurality of copy I/O ports equal in number to the number of copy hard disks. Each copy I/O port respectively has a system-bus interface that is coupled to the system-bus, and also has a hard-disk interface adapted for being coupled to one of the copy hard disk.

Furthermore, the multiple-media duplicating system includes a special I/O port having a system-bus interface that is coupled to the system-bus, and also having a multiple hard-disk interface that is coupled in parallel to the hard-disk interfaces of each of the copy I/O ports. When the master hard disk and several copy hard disks are connected to the respective hard-disk interfaces, execution of the digital computer program by the microprocessor CPU effects a concurrent transfer of digital data from the master hard disk to the system-bus using the master I/O port, and of the digital data from the system-bus in parallel to all of the copy hard disks using the special I/O port.

A preferred embodiment of the multiple-media duplicating system further includes a digital logic circuit that is coupled to the system-bus, to the hard-disk interface of the master I/O port, and to the multiple hard-disk interface of the special I/O port. In this preferred embodiment of the present invention, during execution of the digital computer program by the microprocessor CPU, a command is transmitted to the digital logic circuit via the system-bus which causes the digital logic circuit to transmit, for an interval of time, signals:

to the microprocessor CPU which prevents conventional direct access to the disk drives by suspending execution of the digital computer program by the microprocessor CPU during the interval of time; and to the hard-disk interface of the master I/O port and to the multiple hard-disk interface of the special I/O port which effect, during the interval of time, the copying of digital data from the master hard disk to the copy hard disks.

The digital logic circuit synchronizes concurrent reading of digital data from the master hard disk and writing of digital data in parallel to the copy hard disks to omit storing digital data into and fetching of digital data from the RAM.

A particularly preferred embodiment of the multiple-media duplicating system further includes an adjustable, variable-frequency generator. The adjustable, variable-frequency generator is coupled to the digital logic circuit, and supplies a clock signal to the digital logic circuit which determines a rate at which digital data is copied from the master hard disk in parallel to the copy hard disks.

An advantage of the present invention is a substantial reduction of time required for copying digital data present on the master hard disk to the plurality of copy hard disks.

These and other features, objects and advantages will be understood or apparent to those of ordinary skill in the art from the following detailed description of the preferred embodiment as illustrated in the various drawing figures.

BRIEF DESCRIPTION OF THE DRAWINGS

FIG. 11 is a block diagram depicting a digital logic circuit, that is preferably implemented in a configurable logic IC, which exchanges signals with the remainder of the multi-disk duplicating system to effect copying of digital data from the master hard disk in parallel to all of the copy hard disks without storing digital data into, and without fetching the digital data from a RAM included in the„multi-disk duplicating system; and FIG. 12 is a register diagram depicting control/status registers-included in the digital logic circuit illustrated in FIG. 11.

DETAILED DESCRIPTION

Figure 2:
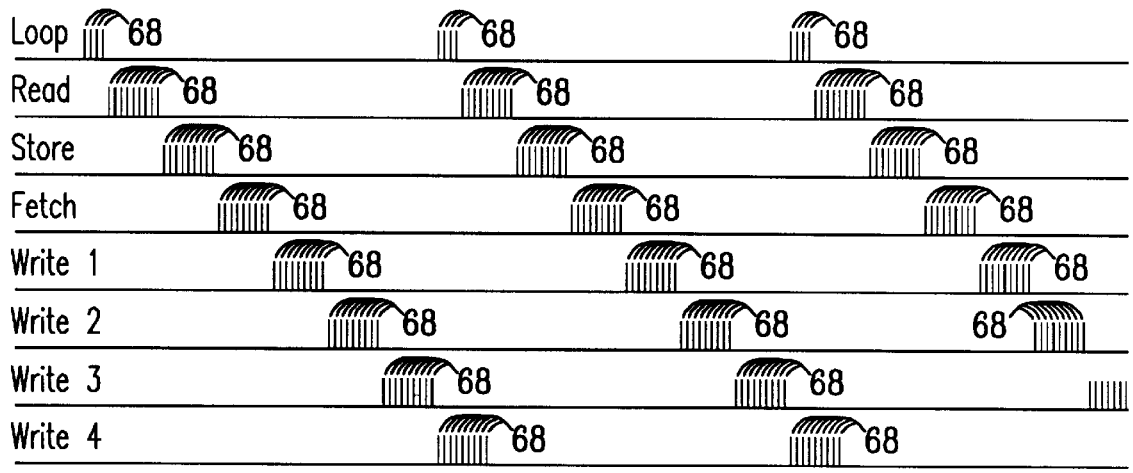
FIG. 2 is a timing diagram conceptually depicting microprocessor CPU clock cycles that occur during normal operation of the prior art multi-disk duplicating system depicted in FIG. 1 for copying digital data from the master hard disk sequentially to each of the copy hard disks.
Figure 3:
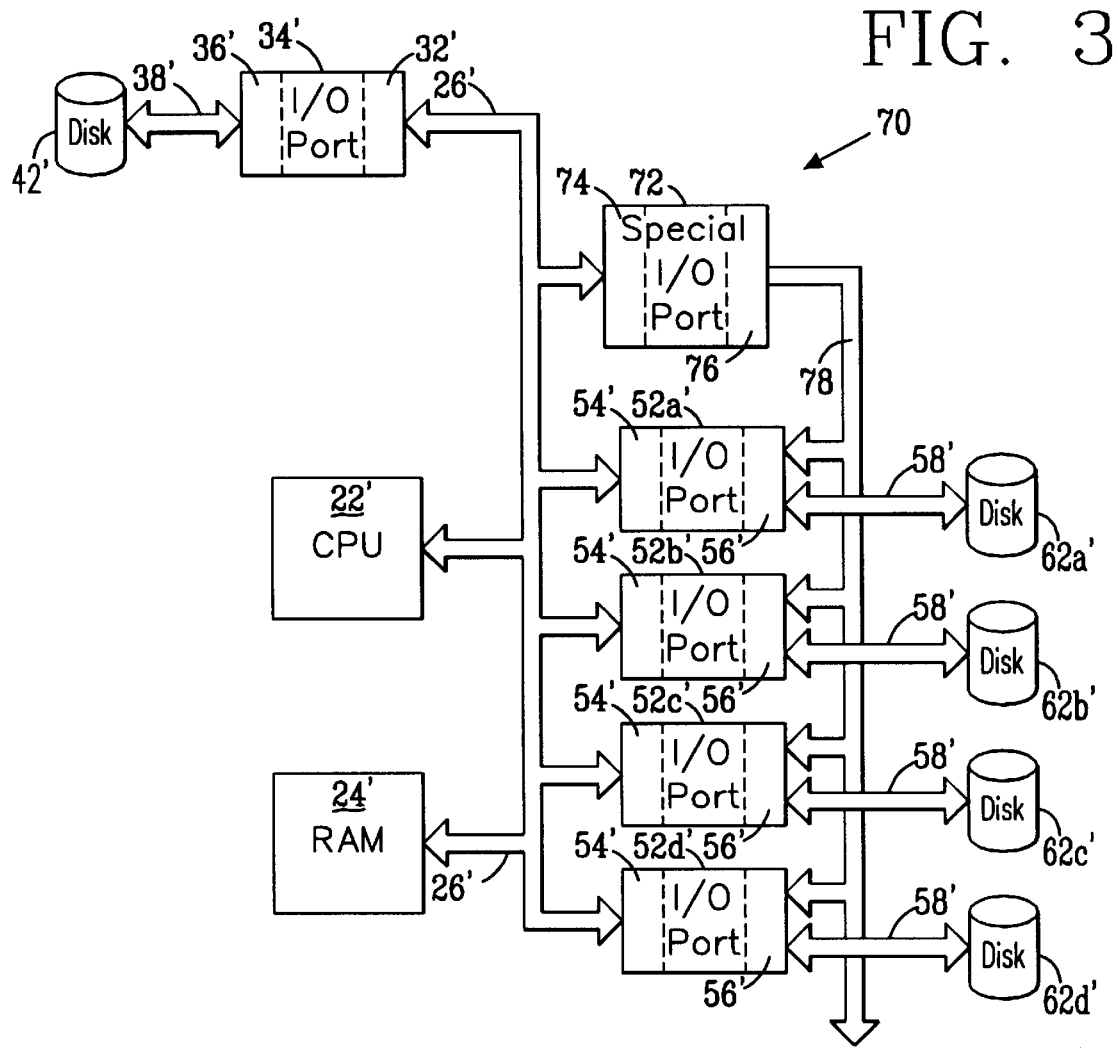
FIG. 3 is a block diagram depicting a multi-disk duplicating system in accordance with the present invention that concurrently copies digital data from a master hard disk on which the data
Figure 4:
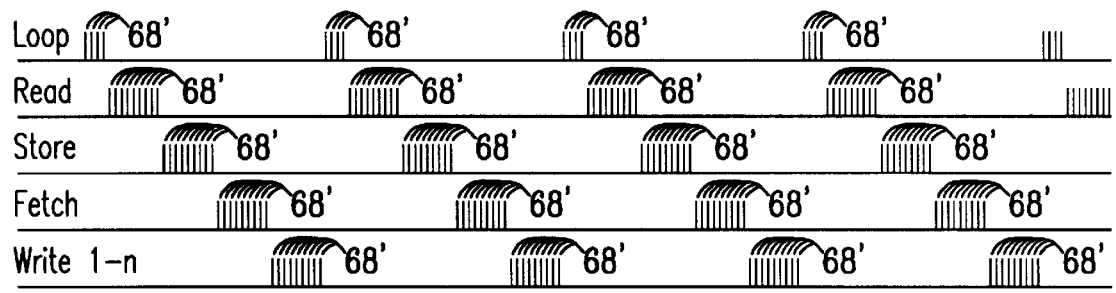
FIG. 4 is a timing diagram conceptually depicting operation of the present invention multi-disk duplicating system depicted in FIG. 3 for copying digital data from the master hard disk in parallel to each of the copy hard disks.

FIG. 3 depicts a multi-disk duplicating system in accordance with the present invention referred to by the general reference character 70. Those elements depicted in FIG. 3 and 4 that are common to the multi-disk duplicating system 20 depicted in FIG. 1 and the timing diagram of FIG. 2 carry the same reference numeral distinguished by a prime ("'") designation. In accordance with the present invention, the multi-disk duplicating system 70 copies digital data from the master hard disk 42' on which the data resides in parallel to the of copy hard disks 62a'–62d'. To effect parallel copying of the digital data to the copy hard disks 62a'–62d', in addition to the elements of the multi-disk duplicating system 20, the multi-disk duplicating system 70 further includes a first special I/O port 72 for writing data to the copy hard disks 62a'–62d'. Similar to the master input/output port 34' and the copy I/O ports 52a'–52d', the special I/O port 72 includes a system-bus interface that is coupled to the system bus 26'. The special I/O port 72 also includes a multiple hard-disk interface 76 that is coupled in parallel to the copy hard-disk interfaces 56' of each of the copy I/O ports 52a'–52d' by a parallel-write bus 78.

Figure 1:
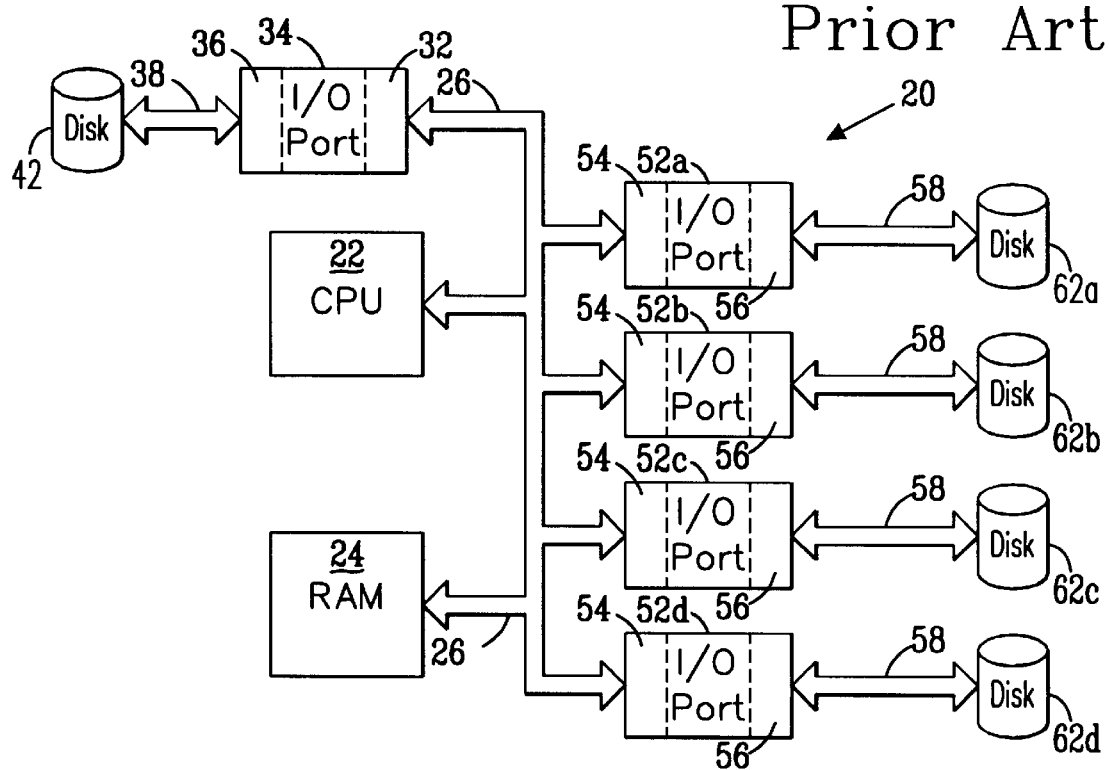
FIG. 1 is a block diagram depicting a multi-disk duplicating system in accordance with the prior art that copies digital data from a master hard disk on which the data resides to several copy hard disks.

In the microprocessor architecture depicted in FIG. 1, the master hard disk 42 and copy hard disks 62a–62d are mapped into address (or I/O) space of the microprocessor CPU 22. Each of the copy I/O ports 52a–52d provides a memory or I/O address for communicating with the master hard disk 42 and with each of copy hard disks 62. However, the microprocessor CPU 22 can communicate only with the master hard disk 42 or with one of copy hard disks 62 individually one at a time. With microprocessor architecture depicted in FIG. 1 and four (4) copy hard disks 62a–62d included in the multi-disk duplicating system 20, the microprocessor CPU 22 can allocate only less than 25% of it's processing power to each copy hard disks 62.

To copy digital data in parallel to all of the copy hard disks 62a'–62d' using the multi-disk duplicating system 70 depicted in FIG. 3, the computer program executed by the microprocessor CPU 22' first prepares the master hard disk 42' for reading data, and all of the copy hard disks 62a'–62d' for writing data. As indicated in the timing diagram of FIG. 4, continued execution of the computer program causes digital data to be read from the master hard disk 42' and stored into the RAM 24' similar to the multi-disk duplicating system 20. Then the computer program executed by the microprocessor CPU 22', rather than writing the digital data sequentially to each of the copy hard disks 62a'–62d' using the copy I/O ports 52a'–52d', addresses the special I/O port 72 rather than the copy I/O ports 52a–52d ' to write the same data to all the copy hard disks 62 in parallel and concurrently. This means that the speed at which data can be written to the copy hard disks 62' is unaffected by the number of copy hard disks 62'. In this way, while the multi-disk duplicating system 70 depicted in FIG. 3 does not decrease the time required to read digital data from the master hard disk 42', the multi-disk duplicating system 70 writes the digital data to the copy hard disks 62a'–62d' "n" times faster than the multi-disk duplicating system 20, where n is the number of copy hard disks 62'.

Figure 5:
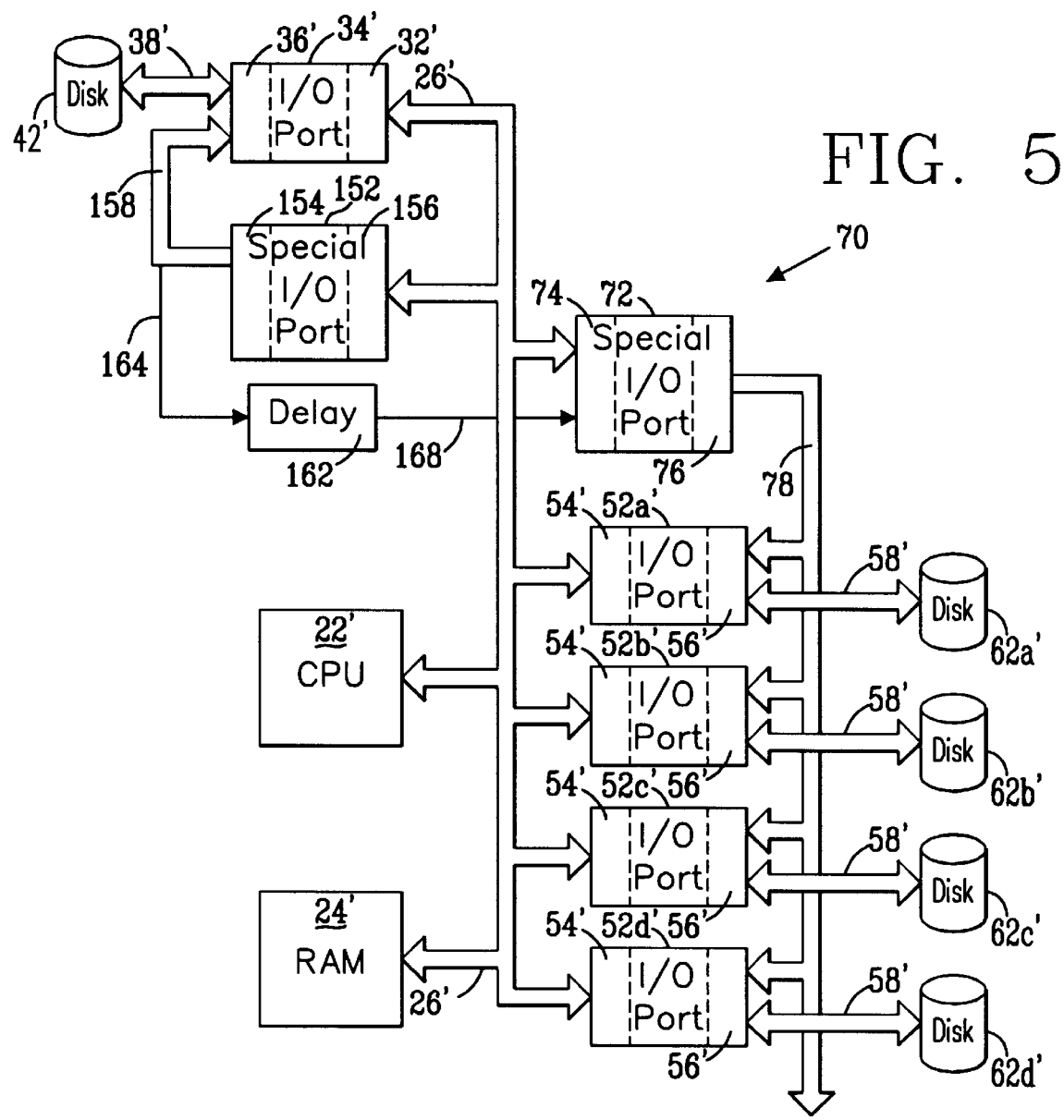
FIG. 5 is a block diagram depicting a multi-disk duplicating system in accordance with the present invention that concurrently reads digital data from a master hard disk on which the data resides while concurrently writing the data to several copy hard disks.

To further increase the duplicating speed of the multi-disk duplicating system 70 depicted in FIG. 3, as depicted in FIG. 5 a second special I/O port 152 for reading data from the master hard disk 42' can be added to the multi-disk duplicating system 70. Similar to the special I/O port 72, the special I/O port 152 includes a system-bus interface 156 that is coupled to the system bus 26'. The special I/O port 152 also includes a master hard-disk interface 154 that is coupled in parallel to the master hard-disk interface 36' of the master input/output port 34' by a master-read bus 158. For the multi-disk duplicating system 70 depicted in FIG. 5, after the master hard disk 42' has been prepared for reading using commands transmitted through the master input/output port 34', the computer program executed by the microprocessor CPU 22' sends read commands to the special I/O port 152 rather than to the master input/output port 34'. The special I/O port 152 transmits at least a read signal to the master hard-disk interface 36' of the master input/output port 34' via the master-read bus 158 that establishes an instant at which the special I/O port 152 effects a transfer digital data from the master hard disk 42' to the microprocessor CPU 22'.

Figure 6:
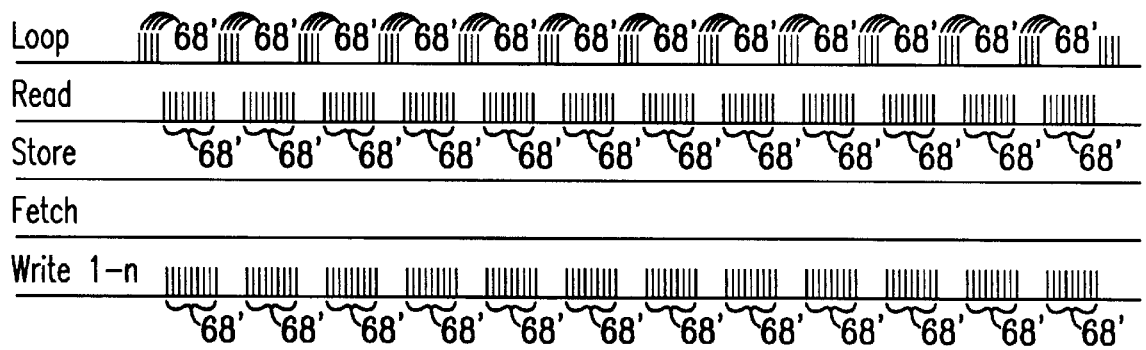
FIG. 6 is a timing diagram conceptually depicting operation of the present invention multi-disk duplicating system depicted in FIG. 5 for copying/ digital data from the master hard disk in parallel to each of the copy hard disks.

The special I/O port 152 also supplies the read signal to a programmable array logic ("PAL") delay circuit 162 via a read-signal line 164. In response to the read signal, the PAL delay circuit 162 transmits a write signal to the special I/O port 72 via a write-signal line 168. The write signal that the PAL delay circuit 162 supplies to the special I/O port 72, which is delayed slightly in time, e.g. twenty (20) nanoseconds ("ns"), from the read signal, establishes an instant at which the special I/O port 72 effects a transfer digital data in parallel to all of the copy hard disks 62'. A circuit configured within the PAL delay circuit 162 delays the write signal with respect to the read signal so the transfer of digital data in parallel to all of the copy hard disks 62' effected by the special I/O port 72 overlaps in time the transfer of digital data, via the system bus 26', from the master hard disk 42' to the microprocessor CPU 22' effected by the special I/O port 152. In this way, as illustrated in FIG. 6 both the interval required for the store and fetch operations to the RAM 24' depicted in FIG. 4 may be eliminated, and the time required to write all "n" copy hard disks 62' may be almost completely overlapped with the time required for reading the data from the master hard disk 42'. In the multi-disk duplicating system 70 depicted in FIG. 5, the computer program executed by the microprocessor CPU 22' still fully controls data copying from the master hard disk 42' to the copy hard disks 62', the amount of data copied, checking for errors, etc.

Figure 7:
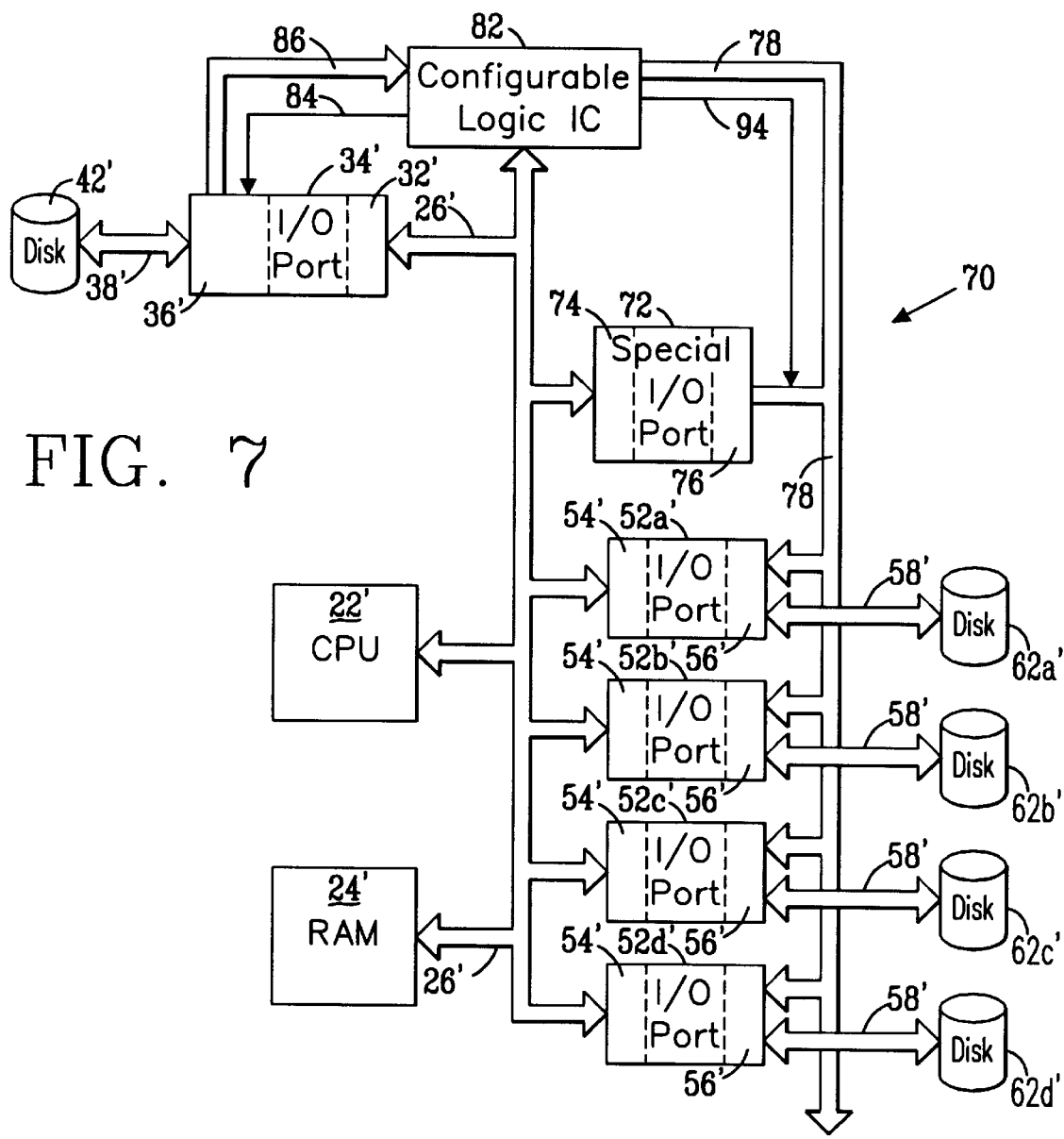
FIG. 7 is a block diagram depicting a preferred embodiment of the multi-disk duplicating system in accordance with the present invention that includes a digital logic circuit that effects copying of digital from the master hard disk in parallel to each of the copy hard disks.

A preferred embodiment of the multi-disk duplicating system 20 depicted in FIG. 7 further includes a digital logic circuit preferably provided by a configurable logic IC 82. As well known to those familiar with configurable logic integrated circuits ("ICs") such as field programmable gate arrays ("FPGAs"), a configurable logic IC is usually configured to operate as a particular digital logic circuit by supplying configuration data, generally formatted as a configuration bit-stream, to one or more configuration input pins of the configurable logic IC. Within the configurable logic IC, this configuration data moves via a built-in shift-register through the configurable logic IC so that after a specified number of bits have been loaded into the configurable logic IC, the configurable logic IC is fully configured to operate as a particular digital logic circuit. Configuration of a particular class of configurable logic ICs is described in greater detail in a "Configurable Logic Design and Application Book," copyright 1995 by Atmel Corporation, that is incorporated herein by reference. Configuration of another class of configurable logic ICs is described in greater detail in a "Xilinx 1998 Data Book."

As illustrated in FIG. 7, the configurable logic IC 82 is coupled to the system bus 26' to permit exchanging control and status data between the configurable logic IC 82 and the microprocessor CPU 22. Both a read/write signal line 84 and a data-out bus 86 couple the configurable logic IC 82 to the master hard-disk interface 36' of the master input/output port 341. The parallel-write bus 78 together with a read/write signal line 94 couple the configurable logic IC 82 to the multiple hard-disk interface 76 of the special I/O port 72, and to the copy hard-disk interfaces 56' of all the copy I/O ports 52'. In copying digital data using this preferred embodiment of the present invention, similar to the multi-disk duplicating system 70 depicted in FIG. 3, the computer program executed by the microprocessor CPU 221 depicted in FIG. 7 first prepares the master hard disk 42' for reading, and the copy hard disks 62' for writing. Then the computer program executed by the microprocessor CPU 22' transmits a command to the configurable logic IC 82 via the system bus 26' which causes the configurable logic IC 82 to transmit certain signals for an interval of time. A first of the signals transmitted to the microprocessor CPU 22' via the system bus 26' holds the microprocessor CPU 22' off the system bus 26' thereby prevents conventional direct access to the copy hard disks 62' by suspending execution of the digital computer program throughout the interval of time. A second set of the signals transmitted to the master hard-disk interface 36' of the master input/output port 34' via the read/write signal line 84, and to the parallel-write bus 78 via the read/write signal line 94 respectively cause the master hard disk 42' to read a word of digital data, and cause the copy hard disks 62a'–62d' to write a word of digital data. In addition to these control signals transmitted from the configurable logic IC 82, the configurable logic IC 82 also receives the word of data read by the master hard disk 42' via the data-out bus 86, and retransmits that word of data to all of the copy hard disks 62' via the parallel-write bus 78.

Because the signals transmitted by the configurable logic IC 82 during copying of digital data from the master hard disk 42' to the copy hard disks 62' halt operation of the microprocessor CPU 22', the configurable logic IC 82 must provide storage for the digital data being copied that is usually provided by the microprocessor CPU 22 during conventional microprocessor I/O operations such as those illustrated in FIGS. 1–4. Analogously, the state/timing machine 116 of the configurable logic IC 82 includes a counter to which increments as each word of data is copied from the master hard disk 42' to the copy hard disks 62'.

After the configurable logic IC 82 has effected copying of a pre-established amount of digital data from the master hard disk 42' to the copy hard disks 62', the time interval ends and a signal transmitted from the configurable logic IC 82 to the microprocessor CPU 22' via the system bus 26' returns control of the system bus 26' and the copy hard disks 62' to the microprocessor CPU 22'. Upon returning control of the system bus 26' and the copy hard disks 62' to the microprocessor CPU 22', the computer program executed by the microprocessor CPU 22' checks the status of the data copying operation, tests ready bits in the master hard disk 42' and the copy hard disks 621' etc.

Figure 8:
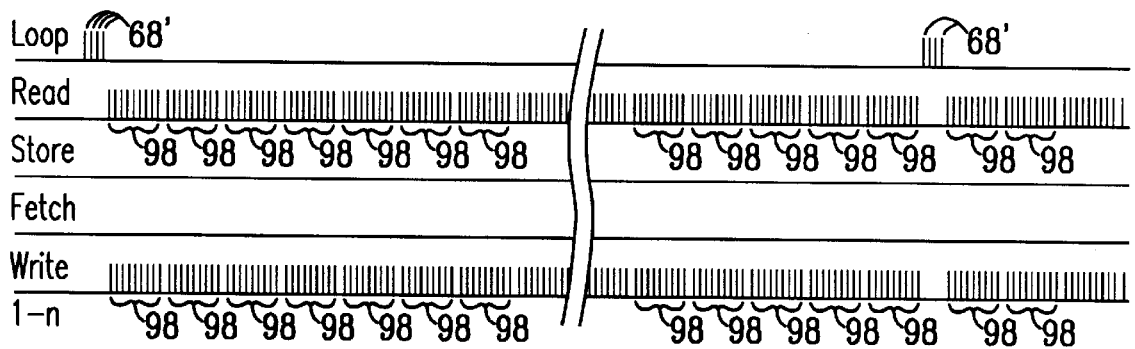
FIG. 8 is a timing diagram conceptually depicting operation of the present invention multi-disk duplicating system depicted in FIG. 7 for copying digital data from the master hard disk in parallel to each of the copy hard disks.

As summarized above and as will be explained in greater detail below in connection with FIGS. 7–10, the timing diagram of FIG. 8 show that the signals exchanged between the configurable logic IC 82 and the remainder of the multi-disk duplicating system 70 effect copying of digital data from the master hard disk in parallel to all of the copy hard disks 62' without storing digital data into, and without fetching the digital data from the RAM 24'. Because the signals transmitted from the configurable logic IC 82 halt operation of the microprocessor CPU 22' throughout the interval of time that data is being copied from the master hard disk 42' to the copy hard disks 62a'–62d', the vertical lines along the horizontal lines respectively labeled "Read" and "Write" in FIG. 8 no longer truly represent clock cycles of the microprocessor CPU 22' such as those illustrated in FIGS. 2 and 4. Rather in FIG. 8 each group 98 of vertical lines along the horizontal lines respectively labeled "Read" and "Write" represents a duration of time respectively required for reading a word of data from the master hard disk 42', or for storing a word of data in parallel into all of the copy hard disks 62'.

The configuration of the multi-disk duplicating system 70 depicted in FIG. 7, that includes the configurable logic IC 82, is preferred in comparison with the configuration depicted in FIG. 5, that includes the special I/O port 152 and the PAL delay circuit 162. The configuration depicted in FIG. 7 is preferred because the configurable logic IC 82, whose internal structure is illustrated in FIG. 11, transmits sequential read commands to the master input/output port 34' faster than the more complicated microprocessor CPU 22' transmits sequential read commands to the special I/O port 152.

Figures 9, 10:
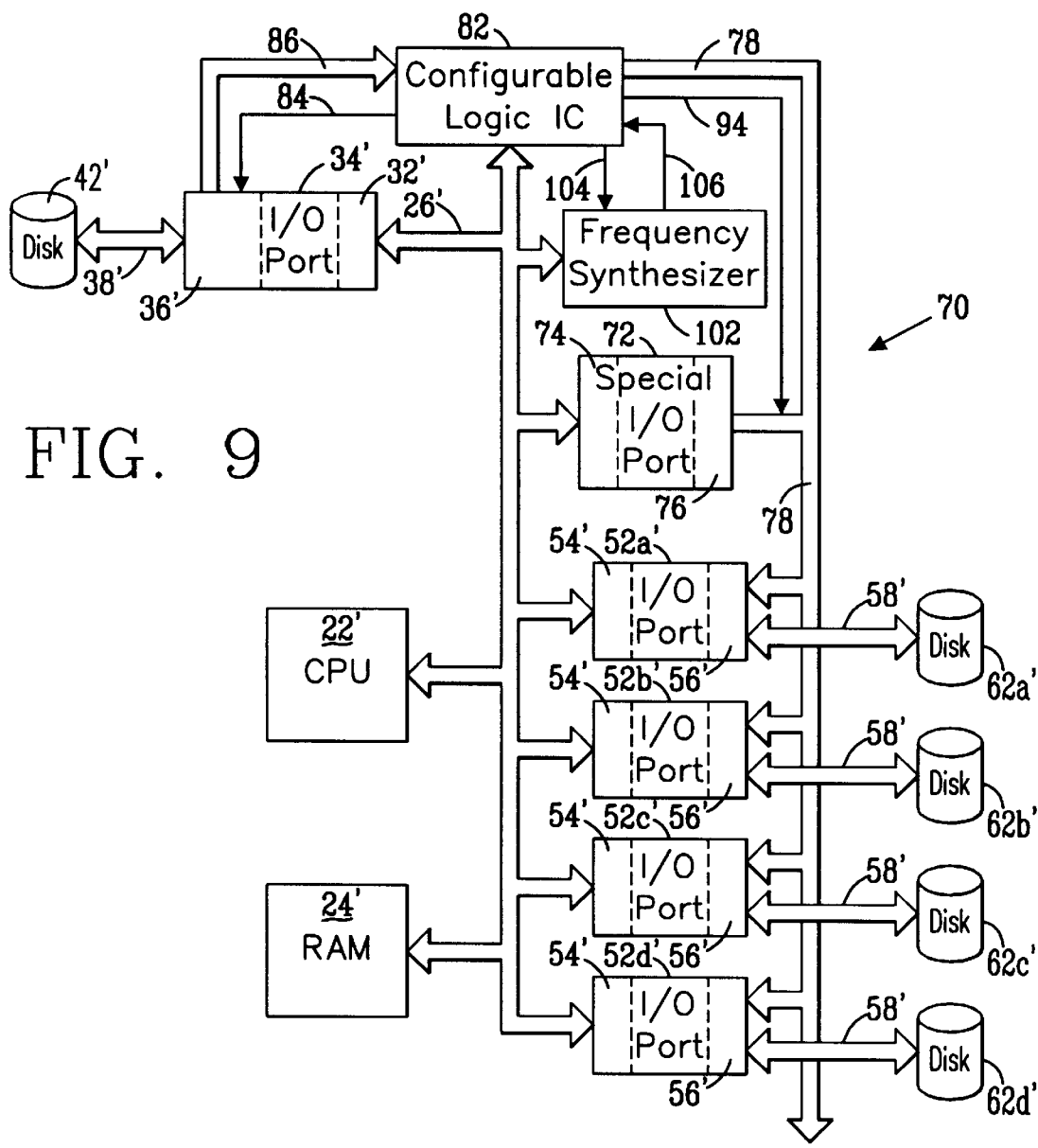
FIG. 9 is a block diagram depicting a particularly preferred embodiment of the multi-disk duplicating system in accordance with the present invention that includes an adjustable, variable-frequency generator for controlling a rate at which digital data is copied from the master hard disk in parallel to each of the copy hard disks.
FIG. 10 is a timing diagram conceptually depicting operation of the present invention multi-disk duplicating system depicted in FIG. 9 for copying digital data from the master hard disk in parallel to each of the copy hard disks.

A particularly preferred embodiment of the multi-disk duplicating system 70 depicted in FIG. 9 further includes an adjustable, variable-frequency synthesizer 102. The adjustable, variable-frequency synthesizer 102 is coupled to the configurable logic IC 82, and supplies a clock signal to the configurable logic IC 82 which determines a rate at which digital data is copied from the master hard disk 42' in parallel to the copy hard disks 62a'–62d'. To permit the computer program executed by the microprocessor CPU 22' to supervise operation of the synthesizer 102, the synthesizer 102 is coupled to the system bus 26'. Moreover, a control-signal line 104 couples the configurable logic IC 82 to the synthesizer 102 to control operation of the synthesizer 102 while data is being copied from the master hard disk 42' to the copy hard disks 62a'–62d'. A clock-signal line 106 coupling the synthesizer 102 to the configurable logic IC 82 supplies the clock signal to the configurable logic IC 82 that establishes the rate at which data is copied from the master hard disk 42' to the copy hard disks 62a'–62d'. FIG. 10 illustrates a further increase in performance obtained by including the synthesizer 102 in the multi-disk duplicating system 70.

FIG. 11 depicts the digital logic circuit implemented in the configurable logic IC 82. Configuration of the configurable logic IC 82 establishes therein a set of control/status registers 112 that are coupled to the system bus 26'. In effecting the copying of digital data from the master hard disk 42' to the copy hard disks 62a'–62d', the computer program executed by the microprocessor CPU 22' stores control data into, and retrieves status data from the control/status registers 112. A control/status bus 114 couples the control/status registers 112 to a programmable state/timing machine 116 that is also configured in the configurable logic IC 82. During copying of digital data from the master hard disk 42' to the copy hard disks 62a'–62d', the state/timing machine 116 transmits read/write control signals respectively to the master hard-disk interface 36' of the master input/output port 34' via the read/write signal line 84, and to the parallel-write bus 78 via the read/write signal line 94.

A clock-signal bus 122 couples the state/timing machine 116 to a clock/synthesizer control logic 124 that is established in the configurable logic IC 82 by configuration data. The clock/synthesizer control logic 124 supplies a control signal to the synthesizer 102 via the control-signal line 104 that starts and stops transmission of clock signal by the synthesizer 102 to the clock/synthesizer control logic 124 via the clock-signal line 106. If the multi-disk duplicating system 70 omits the synthesizer 102 as depicted in the block diagram of FIG. 7, then the clock/synthesizer control logic 124 may receive the clock signal from the system bus 26', but preferably receives the clock signal from a separate crystal oscillator that matches closely the operating speed of the combined master hard disk 42' and copy hard disks 62'.

The configurable logic IC 82 also includes a data retiming latch 132. Digital data transferred from the master hard disk 42' to the master input/output port 34', responsive to a read signal transmitted from the state/timing machine 116 of the configurable logic IC 82 to the master input/output port 34' via the read/write signal line 84, is retransmitted from the master input/output port 34' to the data retiming latch 132 of the configurable logic IC 82 via the data-out bus 86. At a time delayed slightly, e.g. twenty (20) ns, from the time at which the state/timing machine 116 transmits the read signal to the master input/output port 34' via the read/write signal line 84, the state/timing machine 116 transmits to the data retiming latch 132 via a timing-signals bus 134 a signal that causes the data retiming latch 132 to store the data then present on the data-out bus 86. A short wile later, e.g. 10 ns, the state/timing machine 116 transmits a write signal to the copy hard-disk interfaces 56' of the copy I/O ports 52' via the read/write signal line 94, and then transmits a signal to the data retiming latch 132 via the timing-signals bus 134 which causes retransmission of the digital data stored in the data retiming latch 132 onto the parallel-write bus 78.

The register diagram of FIG. 12 depicts the control/status registers 112 configured into the configurable logic IC 82. Data transmitted to the configurable logic IC 82 via the system bus 26' by the computer program executed by the microprocessor CPU 22' that sets a bit or multiple bits in an eight (8) bit long drive-reset register 112a in the specific embodiment depicted in FIG. 12 causes the corresponding master hard disk 42' and/or copy hard disks 62a'–62d' to be reset. Data read from the drive-reset register 112a provides status information to the computer program executed by the microprocessor CPU 22'. Data transmitted to the configurable logic IC 82 via the system bus 26' by the computer program executed by the microprocessor CPU 22' that sets a particular bit in an eight (8) bit long read/write start data copy register 112b in the specific embodiment depicted in FIG. 12 causes the configurable logic IC 82 to begin operation for writing data to the copy hard disks 62a'–62d' under the control of other data previously stored into the control/status registers 112. When all the data has been automatically written to the copy hard disks 62a'–62d', the configurable logic IC 82 releases the microprocessor CPU 22' to continue execution of the computer program, and transmits an interrupt to the microprocessor CPU 22'.

Data stored into an eight (8) bit long, read/write block-count register 112c by the computer program executed by the microprocessor CPU 22' specifies the number of number of data blocks, each 512 word long, that are to be written to the copy hard disks 62a'–62d'. Thus, for data consisting of sixteen (16) bit words, i.e. two (2) byte words, data stored into the block-count register 112c may specify writing up to 256×256×2 bytes for each loop of the computer program executed by the microprocessor CPU 22', i.e. 128 K bytes.

Data transmitted to the configurable logic IC 82 via the system bus 26' by the computer program executed by the microprocessor CPU 22' that sets a bit or multiple bits in an eight (8) bit long, read/write drive-mask register 112d excludes the corresponding copy hard disks 62a'–62d' from the data writing operation being effected by the configurable logic IC 82. An eight (8) bit long, read/write control register A 112e, an eight (8) bit long, read/write control register B 112f, and an eight (8) bit long, read/write control register C 112g, store data for controlling operation of the synthesizer 102, internal functions of the configurable logic IC 82, enabling and clearing interrupts, setting the automatic data writing operating mode of the configurable logic IC 82 in which data is written to the copy hard disks 62a'–62d' but not read from the master hard disk 42', and enabling counting the number of waits generated by the copy hard disks 62a'–62d'. Adroit use of facilities provided by the registers 112d–112g facilitates adapting operation of the multi-disk duplicating system 70 for various contingencies such as excluding one or more of the copy hard disks 62' from an ongoing copying operation should it suddenly start producing unanticipated errors. Data read from an eight (8) bit long, read only wait-counter register 112h by the computer program executed by the microprocessor CPU 22' specifies the number of waits generated by the copy hard disks 62a'–62d'.

The multi-disk duplicating system 70 depicted in FIG. 9 when operating in its drive testing mode uses, in combination, the automatic data writing operating mode of the configurable logic IC 82, the frequency of the clock signals supplied from the synthesizer 102 to the configurable logic IC 82, and the data which the computer program executed by the microprocessor CPU 22' reads from the wait-counter register 112h to determine a maximum rate at which data may be written to the copy hard disks 62a'–62d'. The computer program executed by the microprocessor CPU 22' "tests" the copy hard disks 62' at increasingly faster clock speeds to establish an absolute maximum data transfer rate at which they will operate. Upon reaching a frequency at which a first of the copy hard disks 62' fails to transfer data, the computer program executed by the microprocessor CPU 22' reduces the frequency of clock signals transmitted by synthesizer 102 to a maximum safe and reliable value, after which the multi-disk duplicating system 70 copies the digital data from the master hard disk 42' in parallel to all of the copy hard disks 62'.

Although the present invention has been described in terms of the presently preferred embodiment, it is to be understood that such disclosure is purely illustrative and is not to be interpreted as limiting. For example, as indicated in FIGS. 3, 5, 7 and 9 the parallel-write bus 78 may be extended beyond copy I/O port 52d' and the number of copy I/O ports 52' increased to permit copying digital data to a number of copy hard disks 62' greater than the four (4) depicted in FIGS. 3, 5, 7 and 9. Similarly, the number of bytes of digital data transferred in a single read or write operation may be greater than one (1) byte, e.g. a wide SCSI bus which transfers two (2) bytes for each read or write operation. While the delay between the read and write signals described above for the multi-disk duplicating system 70 depicted in FIG. 5 is preferably provided by the PAL delay circuit 162, other circuits such as a mono-stable multivibrator (i.e. single-shot), a delay line, or a clock-driven counter-timer could be used to obtain the desired delay. Similarly, while the configurable logic IC 82 is preferably implement in a configurable logic IC it may be implemented using other alternative technologies such as using an application specific integrated circuit ("ASIC). While the present invention has been disclosed in the context of recording the same, identical data onto a plurality of hard disks, those skilled in the art will immediately appreciate that the present invention may also be used for concurrently recording the same, identical data onto a plurality of other types of recording media such as magnetic tapes, compact disk read-only-memory disks ("CD-ROMs"), digital video disks ("DVDs"), etc. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A multiple-media duplicating system for copying digital data from a master media in parallel to a number of copy media, the multiple-media duplicating system comprising:

a system-bus;

a random access memory ("RAM"), that is coupled to the system-bus, for storing both a disk-copy digital computer program and digital data;

a microprocessor central processing unit ("CPU"), that is coupled to the system-bus, which retrieves the digital computer program from the RAM, and which executes the digital computer program for copying digital data in parallel to all the copy media;

a master input/output ("I/O") port having a system-bus interface that is coupled to the system-bus, and also having a master-device interface adapted for being coupled to a master device that includes the master media;

a plurality of copy I/O ports, each copy I/O port respectively having a system-bus interface that is coupled to the system-bus, and also having a copy-device interface adapted for being coupled to one of a plurality of copy devices that respectively include the copy media;

a first special I/O port having a system-bus interface that is coupled to the system-bus, and also having a multiple copy-media interface that is coupled in parallel to the copy-device interfaces of each of said copy I/O ports; when the master device and several copy devices are connected to the respective copy-device interfaces, execution of the digital computer program by said microprocessor CPU effects a transfer of digital data from the master media via said master I/O port, and of the digital data in parallel to all of the copy media via said first special I/O port; and a digital logic circuit that is coupled to the system-bus, to the master-device interface of said master I/O port, and to the multiple copy-media interface of said first special I/O port; execution of the digital computer program by said microprocessor CPU transmitting a command to said digital logic circuit via said system-bus which causes said digital logic circuit upon receiving the command from the microprocessor CPU to transmit, for an interval of time,, signals:

to said microprocessor CPU which prevents conventional access to the copy devices by suspending execution of the digital computer program by said microprocessor CPU during the interval of time; and to the master-device interface of said master I/O port and to the multiple copy-media interface of said first special I/O port which effect, during the interval of time, the copying of digital data from the master media to the copy media;

whereby digital data is copied from the master media in parallel and concurrently to all of the copy media without storing digital data into and fetching the digital data from the RAM.

2. The multiple-media duplicating system of claim 1 wherein said digital logic circuit includes a configurable logic integrated circuit ("IC").

3. The multiple-media duplicating system of claim 1 further comprising an adjustable, variable-frequency generator that is coupled to the digital logic circuit for supplying to said digital logic circuit a clock signal which determines a rate at which digital data is copied from the master media in parallel to the copy media.

4. The multiple-media duplicating system of claim 3 wherein said variable-frequency generator is also coupled to the system-bus, and digital computer program execution by said microprocessor CPU causes data to be transmitted to said variable-frequency generator for controlling the rate at which digital data is copied from the master media in parallel to the copy media.

5. In a multiple-media duplicating system for copying digital data from a master media in parallel to a number of copy media that includes:

a system-bus;

a RAM, that is coupled to the system-bus, for storing both a disk-copy digital computer program and digital data;

a microprocessor CPU, that is coupled to the system-bus, which retrieves the digital computer program from the RAM, and which executes the digital computer program for copying digital data in parallel to all the copy media;

a master I/O port having a system-bus interface that is coupled to the system-bus, and also having a master-device interface adapted for being coupled to a master device that includes the master media; and a plurality of copy I/O ports, each copy I/O port respectively having a system-bus interface that is coupled to the system-bus, and also having a copy-device interface adapted for being coupled to one of a plurality of copy devices that respectively include the copy media;

the improvement comprising:

a first special I/O port having a system-bus interface that is coupled to the system-bus, and also having a multiple copy-media interface that is coupled in parallel to the copy-device interfaces of each of the copy I/O ports; when the master device and several copy devices are connected to the respective copy-device interfaces, execution of the digital computer program by the microprocessor CPU effects a transfer of digital data from the master media via the master I/O port, and of the digital data in parallel to all of the copy media via the first special I/O port; and a digital logic circuit that is coupled to the system-bus, to the master-device interface of the master I/O port, and to the multiple copy-media interface of said first special I/O port; execution of the digital computer program by the microprocessor CPU transmitting a command to said digital logic circuit via the system-bus which causes said digital logic circuit upon receiving the command from the microprocessor CPU to transmit, for an interval of time, signals:

to the microprocessor CPU which prevents conventional access to the copy devices by suspending execution of the digital computer program by the microprocessor CPU during the interval of time; and to the master-device interface of the master I/O port and to the multiple copy-media interface of said first special I/O port which effect, during the interval of time, the copying of digital data from the master media to the copy media;

whereby digital data is copied from the master media in parallel and concurrently to all of the copy media without storing digital data into and fetching the digital data from the RAM.

6. The multiple-media duplicating system of claim 5 wherein said digital logic circuit includes a configurable logic IC.

7. The multiple-media duplicating system of claim 5 further comprising an adjustable, variable-frequency generator that is coupled to the digital logic circuit for supplying to said digital logic circuit a clock signal which determines a rate at which digital data is copied from the master media in parallel to the copy media.

8. The multiple-media duplicating system of claim 7 wherein said variable-frequency generator is also coupled to the system-bus, and digital computer program execution by the microprocessor CPU causes data to be transmitted to said variable-frequency generator for controlling the rate at which digital data is copied from the master media in parallel to the copy media.

* * * * *